United States Patent
Jha et al.

(10) Patent No.: US 11,113,152 B1
(45) Date of Patent: Sep. 7, 2021

(54) SYSTEMS AND METHODS FOR MANAGING FILE BACKUP

(71) Applicant: Symantec Corporation, Mountain View, CA (US)

(72) Inventors: Mohit Jha, Culver City, CA (US); Vinith Raj, Los Angeles, CA (US); Chengi Jimmy Kuo, Manhattan Beach, CA (US); Amitrajit Banerjee, Marina Del Rey, CA (US)

(73) Assignee: NortonLifeLock Inc., Tempe, AZ (US)

( * ) Notice: Subject to any disclaimer, the term of this patent is extended or adjusted under 35 U.S.C. 154(b) by 665 days.

(21) Appl. No.: 15/626,202

(22) Filed: Jun. 19, 2017

(51) Int. Cl.
*G06F 11/14* (2006.01)
*G06F 16/11* (2019.01)

(52) U.S. Cl.
CPC ........ *G06F 11/1451* (2013.01); *G06F 16/122* (2019.01); *G06F 2201/84* (2013.01)

(58) Field of Classification Search
CPC . G06F 11/1451; G06F 16/122; G06F 2201/84
See application file for complete search history.

(56) References Cited

U.S. PATENT DOCUMENTS

| 7,895,204 | B1* | 2/2011 | Cooley | G06F 16/972 707/736 |
| 8,812,442 | B1* | 8/2014 | Panchbudhe | G06F 11/1453 705/52 |
| 8,825,606 | B1* | 9/2014 | Zhang | G06F 11/2094 707/679 |
| 10,007,795 | B1* | 6/2018 | Chung | G06F 21/568 |
| 2007/0100913 | A1* | 5/2007 | Sumner | G06F 11/1453 |
| 2012/0191536 | A1* | 7/2012 | Chen | G06Q 30/02 705/14.49 |
| 2014/0090077 | A1* | 3/2014 | Jeong | G06F 21/60 726/26 |
| 2018/0075234 | A1* | 3/2018 | Boutnaru | G06F 21/554 |

OTHER PUBLICATIONS

Wikipedia; Rabin fingerprint; https://en.wikipedia.org/wiki/Rabin_fingerprint, as accessed May 22, 2017; Wikipedia.
Gu et al.; Systems and methods for Modifying File Backups in Response to Detecting Potential Ransomware; U.S. Appl. No. 15/011,695; filed Feb. 1, 2016.

* cited by examiner

*Primary Examiner* — Kris E Mackes
*Assistant Examiner* — Lin Lin M Htay
(74) *Attorney, Agent, or Firm* — FisherBroyles, LLP

(57) ABSTRACT

A computer-implemented method for managing file backup may include (i) detecting, by a computing device, an attempt to upload a file to a backup storage, (ii) calculating a degree of difference between the file and a previous version of the file on the backup storage, (iii) comparing, by the computing device, a list of applications that have written to the file with a list of acceptable applications for the file, (iv) calculating, based on the degree of difference and the comparison of the list of applications, a change score for the file, and (v) applying, based on the change score, a backup policy to the attempt to upload the file. Various other methods, systems, and computer-readable media are also disclosed.

20 Claims, 6 Drawing Sheets

SYSTEMS AND METHODS FOR MANAGING FILE BACKUP

BACKGROUND

Computer data is often backed up to a storage space to guard against loss of files that may occur by accident or through malware. For example, when a file is lost, a previously backed up version of the file may be retrieved from a cloud service to restore the lost file. Cloud services may automatically synchronize files on a regular schedule to provide steady backup. However, computer files that are already corrupted may replace backup files during the synchronization, causing the previously uncorrupted files to be lost. For example, ransomware is a form of malware that may encrypt files, and attackers may demand payment before decrypting the files or providing a decryption key. Files corrupted by ransomware and subsequently stored in backup storage may replace unencrypted versions of the file and prevent the original files from being safely restored.

Traditionally, security software may attempt to remove malware after it has infected the device or attempt to minimize the damage during infection. However, in the case of ransomware, encrypted files may be impossible to decrypt and may be permanently lost. Without the ability to restore encrypted files, users are left without a recovery option when backup data is corrupted. Thus, a better backup method is needed to prevent corrupted files from replacing safe backups. The instant disclosure, therefore, identifies and addresses a need for systems and methods for managing file backup.

SUMMARY

As will be described in greater detail below, the instant disclosure describes various systems and methods for managing file backup. In one example, a computer-implemented method for managing file backup may include (i) detecting, by a computing device, an attempt to upload a file to a backup storage, (ii) calculating a degree of difference between the file and a previous version of the file on the backup storage, (iii) comparing, by the computing device, a list of applications that have written to the file with a list of acceptable applications for the file, (iv) calculating, based on the degree of difference and the comparison of the list of applications, a change score for the file, and (v) applying, based on the change score, a backup policy to the attempt to upload the file.

In some embodiments, calculating the degree of difference may include scanning the file and scanning the previous version of the file. Additionally, calculating the degree of difference between the file and the previous version of the file may include calculating the degree of difference based on changes detected in the file.

In some examples, the list of acceptable applications may include an application known to write to a file type of the file. Additionally or alternatively, the list of acceptable applications may include an application approved by a user and/or an application approved by an administrator.

In one embodiment, applying the backup policy may include applying a strict backup policy based on a high change score and/or applying a lenient backup policy based on a low change score. In this embodiment, applying the strict backup policy may include requesting confirmation of the attempt to upload the file from a user of the computing device, adding a new application from the list of applications that have written to the file to the list of acceptable applications, and/or setting a longer time-to-live period for the previous version of the file. Additionally, in the above embodiment, applying the lenient backup policy may include automatically completing the attempt to upload the file to the backup storage and/or setting a shorter time-to-live period for the previous version of the file.

In one example, the computer-implemented method may further include monitoring applications that write to the file. Additionally or alternatively, the computer-implemented method may further include adjusting the list of applications that have written to the file based on detecting a new application.

In one embodiment, a system for implementing the above-described method may include (i) a detection module, stored in memory, that detects, by a computing device, an attempt to upload a file to a backup storage, (ii) a calculation module, stored in memory, that calculates a degree of difference between the file and a previous version of the file on the backup storage, (iii) a comparison module, stored in memory, that compares, by the computing device, a list of applications that have written to the file with a list of acceptable applications for the file, (iv) a change module, stored in memory, that calculates, based on the degree of difference and the comparison of the list of applications, a change score for the file, and (v) a backup module, stored in memory, that applies, based on the change score, a backup policy to the attempt to upload the file. In addition, the system may include at least one processor that executes the detection module, the calculation module, the comparison module, the change module, and the backup module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) detect an attempt to upload a file to a backup storage, (ii) calculate a degree of difference between the file and a previous version of the file on the backup storage, (iii) compare a list of applications that have written to the file with a list of acceptable applications for the file, (iv) calculate, based on the degree of difference and the comparison of the list of applications, a change score for the file, and (v) apply, based on the change score, a backup policy to the attempt to upload the file.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
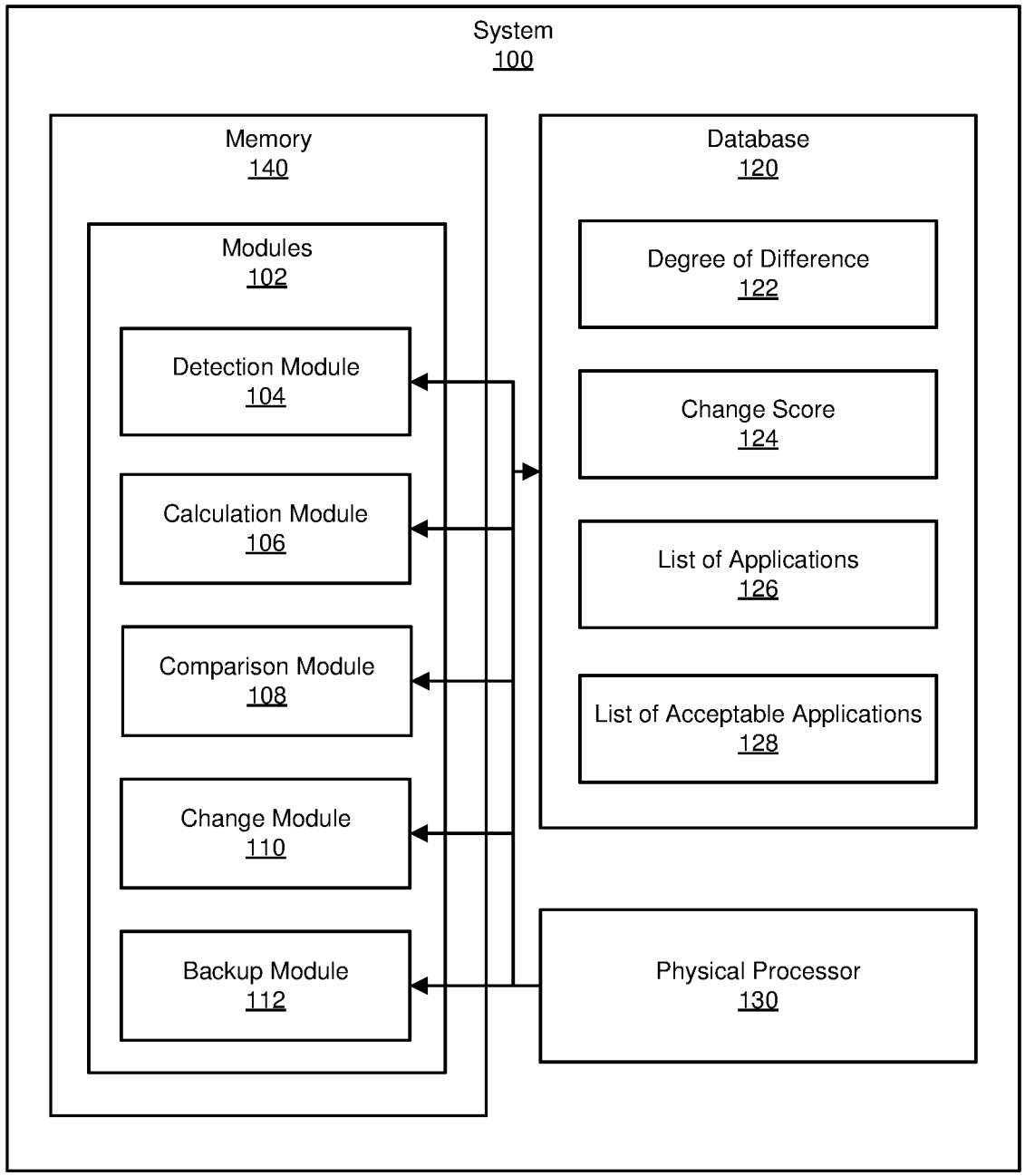
FIG. 1 is a block diagram of an example system for managing file backup.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for managing file backup. As will be explained in greater detail below, by detecting changes in files before backing up data, the systems and methods described herein may prevent an override of uncorrupted files already in backup storage. For example, by comparing new and old versions of a file and tracking applications that write to the file, the disclosed systems and methods may calculate a change score for the file. Furthermore, by applying strict or lenient backup policies based on the change score of the file, the disclosed systems and methods may automate file backup and establish an appropriate time-to-live period for backup files.

In addition, the systems and methods described herein may improve the functioning of a computing device by preserving the integrity of backup data. These systems and methods may also improve the fields of cloud computing and/or file storage by improving an automated backup process. Thus, the disclosed systems and methods may provide additional checks to exclude suspicious files and only back up safe files.

Figure 2:
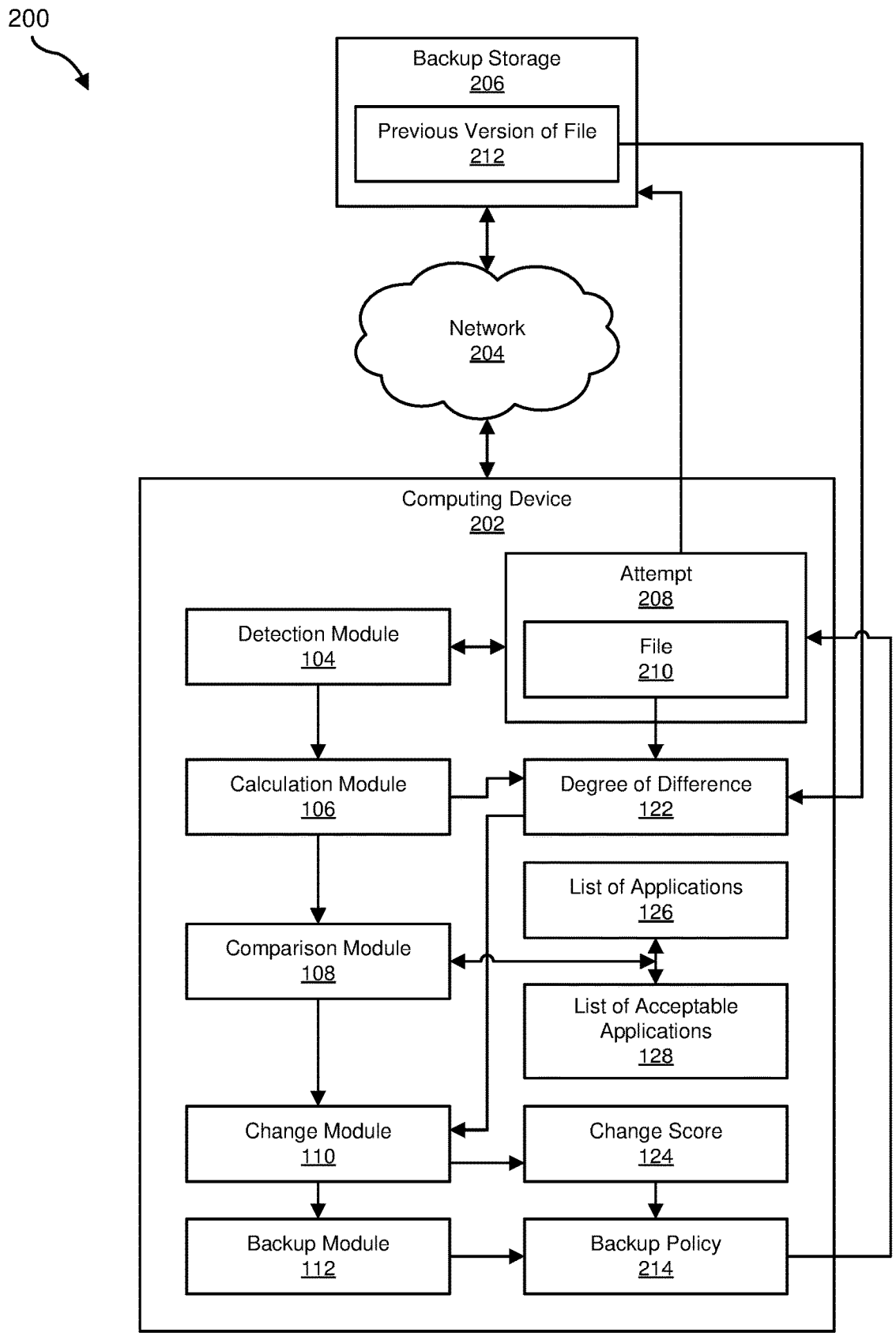
FIG. 2 is a block diagram of an additional example system for managing file backup.

The following will provide, with reference to FIGS. 1 and 2, detailed descriptions of example systems for managing file backup. Detailed descriptions of corresponding computer-implemented methods will also be provided in connection with FIG. 3. In addition, detailed descriptions of example backup policies for example files will be provided in connection with FIG. 4. Furthermore, detailed descriptions of an example computing system and network architecture capable of implementing one or more of the embodiments described herein will be provided in connection with FIGS. 5 and 6, respectively.

FIG. 1 is a block diagram of example system 100 for managing file backup. The term "file backup," as used herein, generally refers to a process of copying and storing files in order to restore files after potential data loss. As illustrated in FIG. 1, example system 100 may include one or more modules 102 for performing one or more tasks. For example, and as will be explained in greater detail below, modules 102 may include a detection module 104 that detects, by a computing device, an attempt to upload a file to a backup storage. Modules 102 may additionally include a calculation module 106 that calculates a degree of difference between the file and a previous version of the file on the backup storage.

Modules 102 may also include a comparison module 108 that compares, by the computing device, a list of applications that have written to the file with a list of acceptable applications for the file. As used herein, the term "application" generally refers to a software program designed to perform specific functions or tasks and capable of being installed, deployed, executed, and/or otherwise implemented on a computing system. Examples of applications may include, without limitation, productivity software, enterprise software, entertainment software, security applications, cloud-based applications, web applications, mobile applications, content access software, simulation software, integrated software, application packages, application suites, variations or combinations of one or more of the same, and/or any other suitable software application.

Modules 102 may further include a change module 110 that calculates, based on the degree of difference and the comparison of the list of applications, a change score for the file. Modules 102 may also include a backup module 112 that applies, based on the change score, a backup policy to the attempt to upload the file. The term "backup policy," as used herein, generally refers to a set of rules to manage a file backup process and the storage of backup copies of files. Although illustrated as separate elements, one or more of modules 102 in FIG. 1 may represent portions of a single module or application or multiple modules or applications.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate managing file backup. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include one or more databases, such as database 120. In one example, database 120 may be configured to store a degree of difference 122, which may include a calculation of difference between two files, and/or a change score 124, which may include a calculation of changes made to a file. Additionally, database 120 may store a list of applications 126, which may include information about applications that made changes to a file, and/or a list of acceptable applications 128, which may include information about approved applications for a specific file. Database 120 may represent portions of a single database or computing device or a plurality of databases or computing devices. For example, database 120 may represent a portion of computing device 202 and/or backup storage 206 in FIG. 2. Alternatively, database 120 in FIG. 1 may represent one or more physically separate devices capable of being accessed by a computing device, such as computing device 202 in FIG. 2.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a backup storage 206 via a network 204. In one example, all or a portion of the functionality of modules 102 may be performed by computing device 202, backup storage 206, and/or any other suitable computing system. Similarly, both backup storage 206 and computing device 202 may be merged into a single machine or computing system such that the functionality of each of modules 102 is provided within a single device.

As will be described in greater detail below, one or more of modules 102 from FIG. 1 may, when executed by at least one processor of computing device 202, enable computing device 202 to secure a backup process against corrupted files. For example, and as will be described in greater detail below, detection module 104 may detect, by computing device 202, an attempt 208 to upload a file 210 to backup storage 206. Calculation module 106 may calculate degree of difference 122 between file 210 and a previous version of file 212 on backup storage 206. Comparison module 108 may compare, by computing device 202, list of applications 126 that have written to file 210 with list of acceptable applications 128 for file 210. Change module 110 may calculate, based on degree of difference 122 and the comparison of list of applications 126, change score 124 for file 210. Backup module 112 may apply, based on change score 124, a backup policy 214 to attempt 208 to upload file 210.

In the example of FIG. 2, and as will be explained in greater detail below, computing device 202 may first detect attempt 208 to upload file 210 to backup storage 206 via network 204. Computing device 202 may then compare file 210 and previous version of file 212 to determine degree of difference 122. Next, computing device 202 may compare list of applications 126 with list of acceptable applications 128 and use the comparison in conjunction with degree of difference 122 to calculate change score 124. Computing device 202 may also determine appropriate backup policy 214 for file 210 based on change score 124. Finally, computing device 202 may apply backup policy 214 to attempt 208 before uploading file 210 to backup storage 206.

Computing device 202 generally represents any type or form of computing device capable of reading computer-executable instructions. For example, computing device 202 may represent an endpoint device running client-side software. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, and/or any other suitable computing device.

Backup storage 206 generally represents any type or form of storage or computing device that is capable of storing and/or managing data. For example, backup storage 206 may represent a cloud service providing client storage space. Additional examples of backup storage 206 include, without limitation, application servers, web servers, storage and/or database servers, cloud services, database 120 in FIG. 1, and/or any other storage system. Although illustrated as a single entity in FIG. 2, backup storage 206 may include and/or represent a plurality of servers that work and/or operate in conjunction with one another. Alternatively, backup storage 206 may represent a portion of computing device 202.

Network 204 generally represents any medium or architecture capable of facilitating communication or data transfer. In one example, network 204 may facilitate communication between computing device 202 and backup storage 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
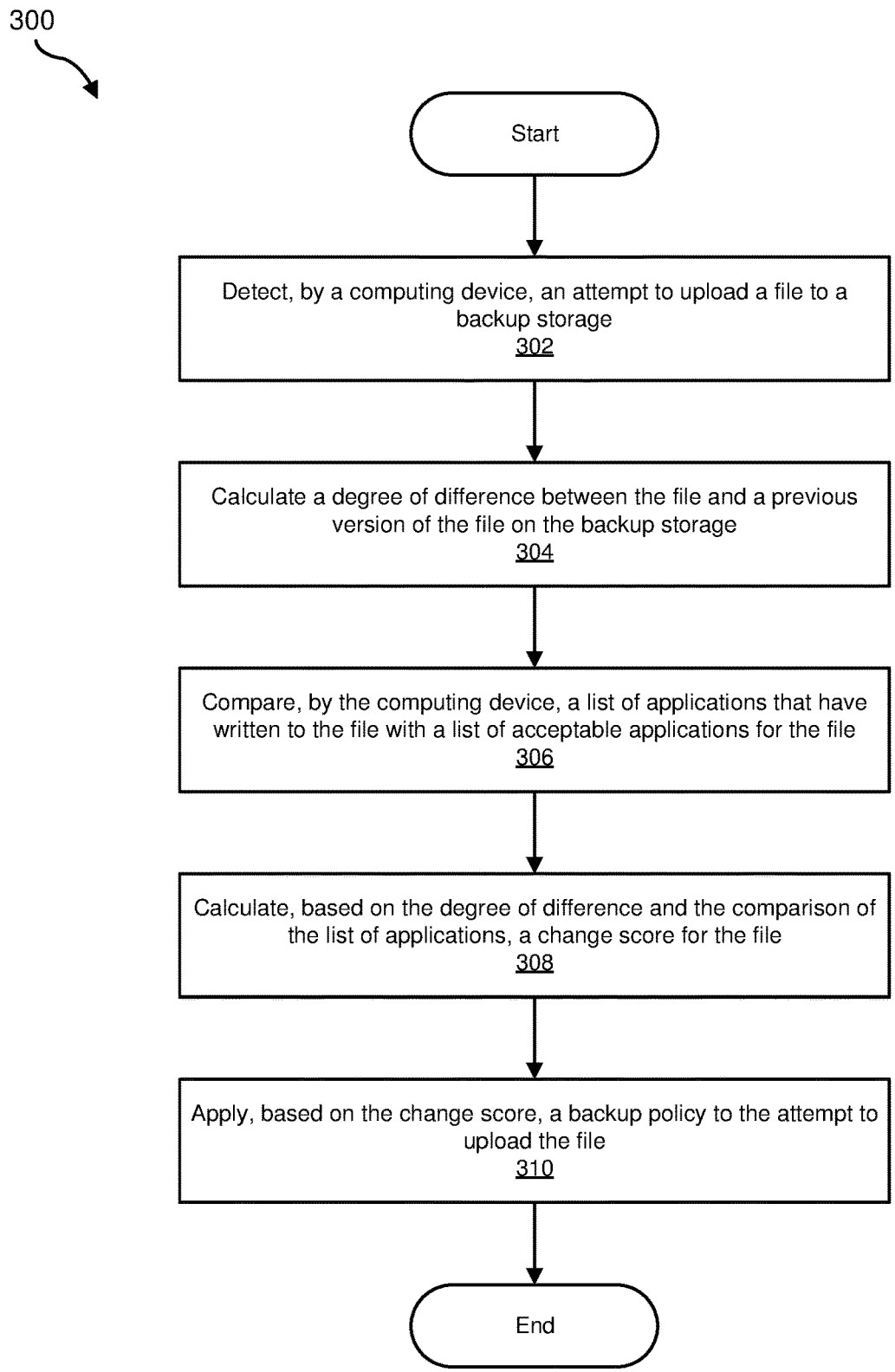
FIG. 3 is a flow diagram of an example method for managing file backup.

FIG. 3 is a flow diagram of an example computer-implemented method 300 for managing file backup. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may detect, by a computing device, an attempt to upload a file to a backup storage. For example, detection module 104 may, as part of computing device 202 in FIG. 2, detect attempt 208 to upload file 210 to backup storage 206.

Detection module 104 may detect attempt 208 in a variety of ways. In some embodiments, detection module 104 may monitor all access to network 204 and/or backup storage 206. In these embodiments, backup storage 206 may represent a server or cloud storage accessed via network 204. Alternatively, backup storage 206 may represent storage on computing device 202, and detection module 104 may detect a backup process running on computing device 202. In other embodiments, detection module 104 may detect attempt 208 by monitoring files on computing device 202, such as file 210.

Returning to FIG. 3, at step 304, one or more of the systems described herein may calculate a degree of difference between the file and a previous version of the file on the backup storage. For example, calculation module 106 may, as part of computing device 202 in FIG. 2, calculate degree of difference 122 between file 210 and previous version of file 212 on backup storage 206.

Calculation module 106 may calculate degree of difference 122 in a variety of ways. In some examples, calculation module 106 may scan file 210, scan previous version of file 212, and calculate degree of difference 122 based on changes detected in file 210. For example, calculation module 106 may scan file 210 and/or previous version of file 212 to identify the contents of file 210 and/or previous version of file 212. Calculation module 106 may receive previous version of file 212 from backup storage 206 or other information about previous version of file 212. Calculation module 106 may then compare the contents of file 210 and previous version of file 212 to detect changes between file 210 and previous version of file 212.

Additionally, calculation module 106 may use hash functions or other identifying information to detect changes in file 210 that differ from previous version of file 212. For example, calculation module 106 may calculate degree of difference 122 based on fingerprinting algorithms. As used herein, the terms "hash" and "fingerprint" generally refer to processes of converting digital data to a fixed value. Notably, these methods may check the integrity of data against a known value, such as by comparing the fingerprints of two files. In this example, calculation module 106 may compare a fingerprint of file 210 against a fingerprint of previous version of file 212 to determine whether file 210 is different from previous version of file 212 and/or an extent to which file 210 is different. Calculation module 106 may then convert the comparison to a value for degree of difference 122.

Returning to FIG. 3, at step 306, one or more of the systems described herein may compare, by the computing device, a list of applications that have written to the file with a list of acceptable applications for the file. For example, comparison module 108 may, as part of computing device 202 in FIG. 2, compare list of applications 126 that have written to file 210 with list of acceptable applications 128 for file 210.

Comparison module 108 may compare list of applications 126 with list of acceptable applications 128 in a variety of ways. In one embodiment, list of acceptable applications 128 may include an application known to write to a file type of the file, an application approved by a user, and/or an application approved by an administrator. The term "file type," as used herein, generally refers to a way of differentiating between various file encodings and types of data contained in computer files. Examples of file types may include, without limitation, filename extensions, file formats, file signatures, or any other method of identifying file content. For example, list of acceptable applications 128 may include applications previously approved for editing text document files, and file 210 may represent a text document. Additionally or alternatively, list of acceptable applications 128 may include applications derived from a record of common applications used to open and/or write to file 210 or similar file types. For example, computing device 202 and/or backup storage 206 may monitor application usage and determine list of acceptable applications 128 based on a history of application usage by users and/or computing devices.

List of acceptable applications 128 may also include applications that the user and/or the administrator of computing device 202 has previously approved. For example, the administrator may approve a list of applications for each file type on a group of computing devices. In another example, the user may open or edit a file after selecting an appropriate application, and the application may be added to list of acceptable applications 128. In another embodiment, previous files uploaded to backup storage 206 may be used to determine previously approved applications. For example, a user may confirm the upload of previous version of file 212 to backup storage 206, and the applications that have written to previous version of file 212 may be added to list of acceptable applications 128 for file 210. In this embodiment, file uploads that are not approved may indicate applications that are not acceptable.

Returning to FIG. 3, at step 308, one or more of the systems described herein may calculate, based on the degree of difference and the comparison of the list of applications, a change score for the file. For example, change module 110 may, as part of computing device 202 in FIG. 2, calculate, based on degree of difference 122 and the comparison of list of applications 126, change score 124 for file 210.

Change module 110 may calculate change score 124 in a variety of ways. In some examples, change score 124 may represent a degree of change that indicates potential corruption in file 210. In these examples, a high change score may indicate file 210 has undergone many changes compared to previous version of file 212 and/or that new or unapproved applications have made those changes. Thus, a high change score may suggest file 210 has been corrupted. Alternatively, in these examples, a low change score may indicate few changes and/or changes made by approved applications, which may indicate a low likelihood of corruption. High and low change scores may also be determined based on relative score values for multiple files and/or by an administrator reviewing scores and potential file corruption.

Figure 4:
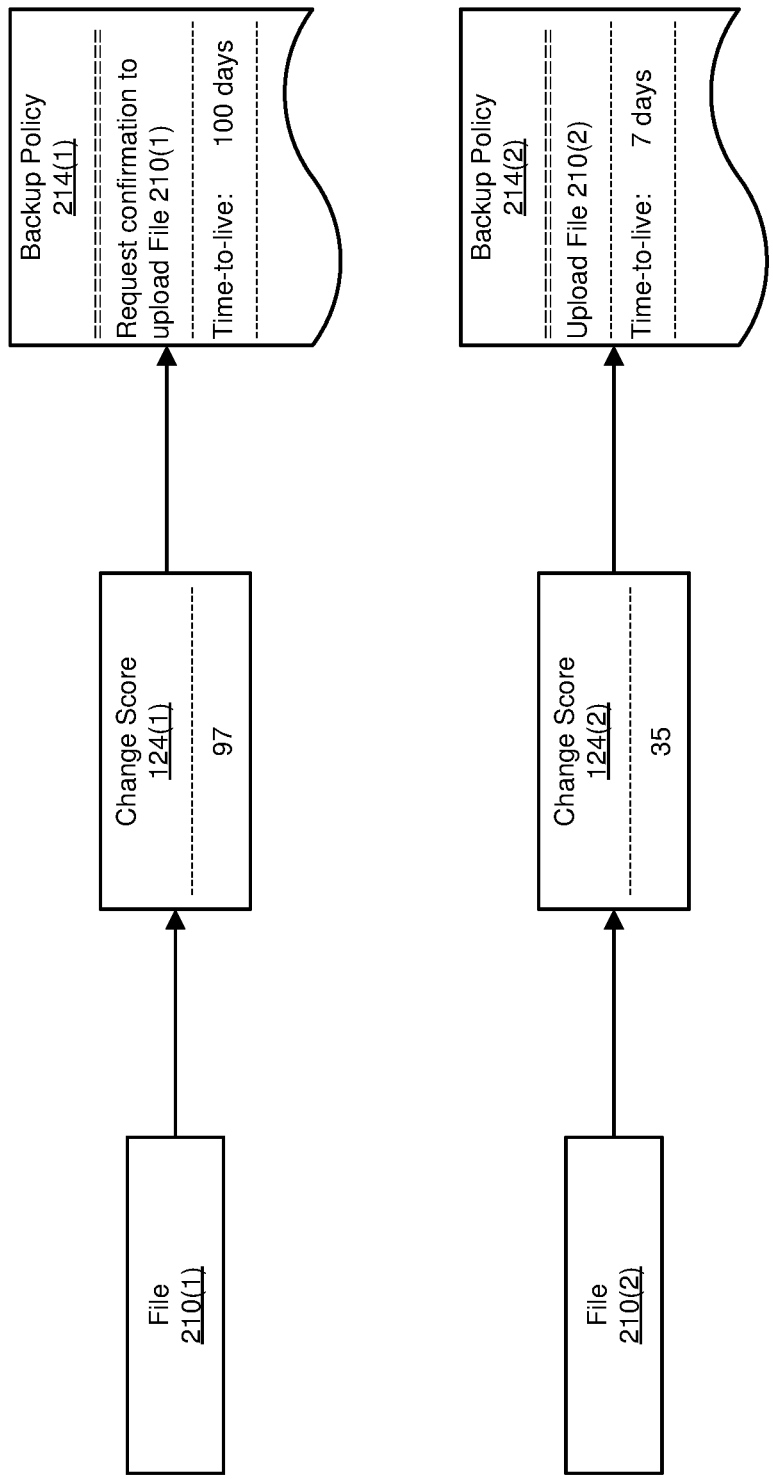
FIG. 4 is a block diagram of example backup policies for example files.

As illustrated in FIG. 4, a file 210(1) may have a change score 124(1) of 97, which may be considered relatively high. In this example, change score 124(1) may indicate that file 210(1) has been compromised by ransomware. The term ransomware, as used herein, generally refers to malware, or malicious software, designed to restrict access to a computer file or component while demanding a ransom to restore access. A file 210(2) may have a change score 124(2) of 35, which may be considered relatively low and at low risk of corruption.

Returning to FIG. 3, at step 310, one or more of the systems described herein may apply, based on the change score, a backup policy to the attempt to upload the file. For example, backup module 112 may, as part of computing device 202 in FIG. 2, apply, based on change score 124, backup policy 214 to attempt 208 to upload file 210.

Backup module 112 may apply backup policy 214 in a variety of ways. In some embodiments, backup module 112 may apply a strict backup policy based on a high change score. In these embodiments, applying the strict backup policy may include requesting confirmation of attempt 208 to upload file 210 from a user of computing device 202, adding a new application from list of applications 126 that have written to file 210 to list of acceptable applications 128, and/or setting a longer time-to-live period for previous version of file 212. The term "time-to-live period," as used herein, generally refers to a set time frame for which a file may be stored. For a longer time-to-live period, backup storage 206 may retain previous version of file 212 for a longer period of time to allow retrieval of data from previous version of file 212 if file 210 is corrupted. In other words, if computing device 202 determines data cannot be retrieved from file 210 due to corruption or ransomware after uploading file 210, computing device 202 may instead retrieve previous version of file 212, which may still be stored in backup storage 206.

In one example, the user may confirm the upload of file 210, which may then enable backup module 112 to complete attempt 208 to upload file 210 to backup storage 206. By confirming the upload of file 210, the user may also confirm that list of applications 126 are acceptable for file 210 and, thus, should be added to list of acceptable applications 128. Alternatively, the user may explicitly confirm one or more applications from list of applications 126 to add to list of acceptable applications 128. In another example, the user may decline the requested confirmation, which may prevent backup module 112 from uploading file 210 to backup storage 206. In this example, applications from list of applications 126 may not be added to list of acceptable applications 128.

In other embodiments, backup module 112 may apply a lenient backup policy based on a low change score. In these embodiments, applying the lenient backup policy may include automatically completing attempt 208 to upload file 210 to backup storage 206 and/or setting a shorter time-to-live period for previous version of file 212. With a low change score, backup policy 214 may not require user confirmation before uploading file 210. Additionally, backup storage 206 may retain previous version of file 212 for a shorter period of time if file 210 is a safe copy.

In the example of FIG. 4, backup module 112 may apply a strict backup policy 214(1) to file 210(1) due to high change score 124(1). Backup policy 214(1) may require confirmation from a user before uploading file 210(1) and may also set the time-to-live period for previous version of file 212 for a longer time span (e.g., 100 days). Conversely, backup module 112 may apply a lenient backup policy 214(2) to file 210(2) due to low change score 124(2). Backup policy 214(2) may automatically upload file 210(2) and set the time-to-live period to a shorter time span (e.g., 7 days).

In one embodiment, the systems described herein may further include monitoring applications that write to file 210 and/or adjusting list of applications 126 that have written to file 210 based on detecting a new application. In this embodiment, computing device 202 may monitor and track all applications that write to file 210 and add each new or previously undetected application to list of applications 126. Thus, computing device 202 may keep an updated list of applications 126 for all applications that may modify file 210.

As explained above in connection with method 300 in FIG. 3, the disclosed systems and methods may, by evaluating a record of changes to a file, determine what backup policy to apply to the file. Specifically, the disclosed systems and methods may calculate a change score based on applications that have written to the file and the amount of change between the file and a previous version stored in backup. By comparing the applications with known and/or approved applications, the systems and methods described herein may detect suspicious changes to the file that may indicate malware or corruption of the file.

By applying a strict or lenient policy based on the calculated change score, the disclosed systems and methods may then determine whether to upload files and how long to retain the previous version of the file in backup. In some examples, the systems and methods described herein may require a user to confirm whether or not to upload the file. Additionally, the systems and methods described herein may provide the user with options to add new applications to a list of approved applications for the file.

As detailed above, by analyzing changes to a file before backup, the disclosed systems and methods may automate a backup policy selection for files to prevent data loss due to corruption. Furthermore, by retaining previous file versions for longer periods of time when files have high change scores, the disclosed systems and methods may safeguard data to allow recovery from the previous file versions. Thus, the systems and methods described herein may prevent corrupt files from replacing safe files in backup storage during file backup.

Figure 5:
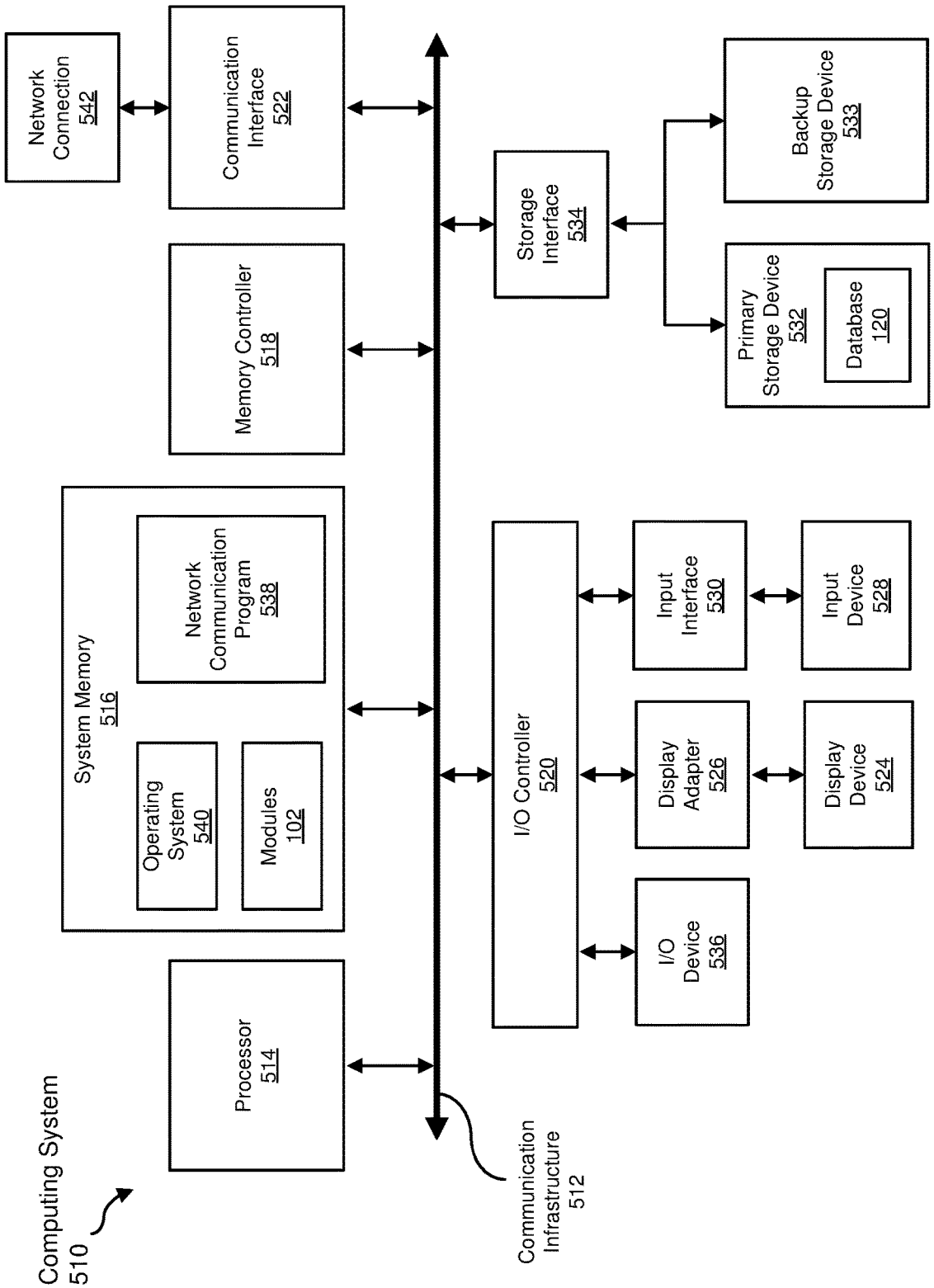
FIG. 5 is a block diagram of an example computing system capable of implementing one or more of the embodiments described and/or illustrated herein.

FIG. 5 is a block diagram of an example computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the example embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In some examples, system memory 516 may store and/or load an operating system 524 for execution by processor 514. In one example, operating system 524 may include and/or represent software that manages computer hardware and software resources and/or provides common services to computer programs and/or applications on computing system 510. Examples of operating system 624 include, without limitation, LINUX, JUNOS, MICROSOFT WINDOWS, WINDOWS MOBILE, MAC OS, APPLE'S 10S, UNIX, GOOGLE CHROME OS, GOOGLE'S ANDROID, SOLARIS, variations of one or more of the same, and/or any other suitable operating system.

In certain embodiments, example computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

As illustrated in FIG. 5, computing system 510 may also include at least one display device 524 coupled to I/O controller 520 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, example computing system 510 may also include at least one input device 528 coupled to I/O controller 520 via an input interface 530. Input device 528 generally represents any type or form of input device capable of providing input, either computer or human generated, to example computing system 510. Examples of input device 528 include, without limitation, a keyboard, a pointing device, a speech recognition device, variations or combinations of one or more of the same, and/or any other input device.

Additionally or alternatively, example computing system 510 may include additional I/O devices. For example, example computing system 510 may include I/O device 536. In this example, I/O device 536 may include and/or represent a user interface that facilitates human interaction with computing system 510. Examples of I/O device 536 include, without limitation, a computer mouse, a keyboard, a monitor, a printer, a modem, a camera, a scanner, a microphone, a touchscreen device, variations or combinations of one or more of the same, and/or any other I/O device.

Communication interface 522 broadly represents any type or form of communication device or adapter capable of facilitating communication between example computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

In some examples, system memory 516 may store and/or load a network communication program 538 for execution by processor 514. In one example, network communication program 538 may include and/or represent software that enables computing system 510 to establish a network connection 542 with another computing system (not illustrated in FIG. 5) and/or communicate with the other computing system by way of communication interface 522. In this example, network communication program 538 may direct the flow of outgoing traffic that is sent to the other computing system via network connection 542. Additionally or alternatively, network communication program 538 may direct the processing of incoming traffic that is received from the other computing system via network connection 542 in connection with processor 514.

Although not illustrated in this way in FIG. 5, network communication program 538 may alternatively be stored and/or loaded in communication interface 522. For example, network communication program 538 may include and/or represent at least a portion of software and/or firmware that is executed by a processor and/or Application-Specific Integrated Circuit (ASIC) incorporated in communication interface 522.

As illustrated in FIG. 5, example computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, database 120 from FIG. 1 may be stored and/or loaded in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 510 may be configured as an ASIC adapted to implement one or more of the example embodiments disclosed herein.

Figure 6:
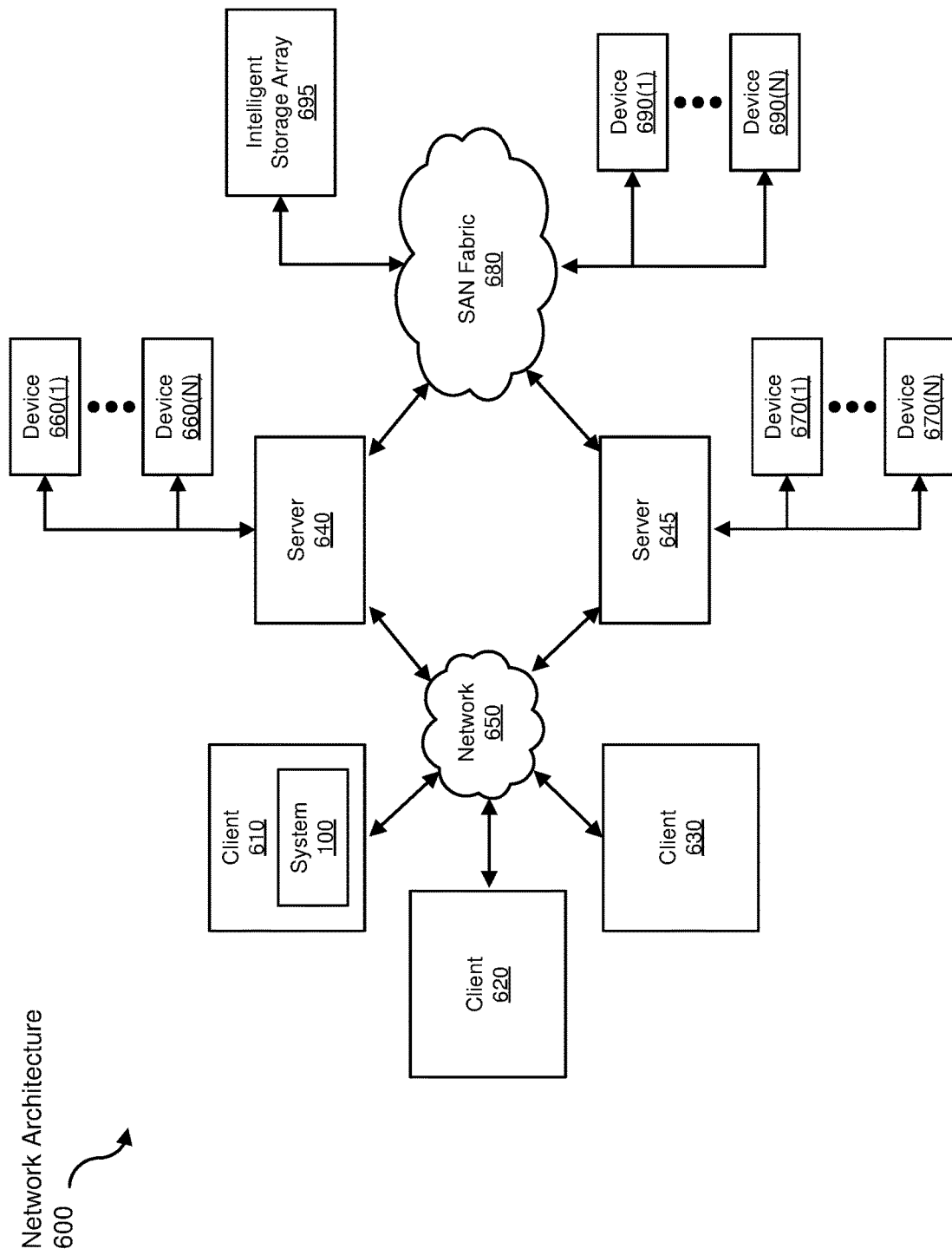
FIG. 6 is a block diagram of an example computing network capable of implementing one or more of the embodiments described and/or illustrated herein.

FIG. 6 is a block diagram of an example network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as example computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to example computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the example embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an example method for managing file backup.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered examples in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive a list of applications to be transformed, transform the list of applications, output a result of the transformation to a storage or output device, use the result of the transformation to calculate a change score, and store the result of the transformation in a server or database. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for managing file backup, at least a portion of the method being performed by a computing device comprising at least one processor, the method comprising:
    detecting, by the computing device, an attempt to upload a file to a backup storage;
    calculating a degree of difference indicating changes between the file and a previous version of the file on the backup storage;
    comparing, by the computing device, a list of acceptable software applications for the file with a list of software applications that have made the changes to the file, wherein the computing device tracks each software application that writes to the file by adding previously undetected software applications to the list of software applications that have made the changes to the file;
    calculating a change score for the file that indicates a likelihood of corruption in the file, wherein the change score is based on:
        the degree of difference; and
        the comparison of the list of software applications that have made the changes with the list of acceptable software applications; and
    applying, based on the likelihood of corruption in the file indicated by the change score, a backup policy to the attempt to upload the file, wherein the backup policy sets a time-to-live period for the previous version of the file.

2. The method of claim 1, wherein calculating the degree of difference comprises:
    scanning the file;
    scanning the previous version of the file; and
    calculating the degree of difference based on the changes detected in the file.

3. The method of claim 1, wherein the list of acceptable software applications comprises at least one of:
    a software application known to write to a file type of the file;
    a software application approved by a user; and
    a software application approved by an administrator.

4. The method of claim 1, wherein applying the backup policy comprises at least one of:
    applying a strict backup policy based on the change score, as determined by administrator review in comparison to other change scores; and
    applying a lenient backup policy based on the change score, as determined by the administrator review in comparison to the other change scores.

5. The method of claim 4, wherein applying the strict backup policy comprises at least one of:
    requesting confirmation of the attempt to upload the file from a user of the computing device;
    adding a new software application from the list of software applications that have made the changes to the file to the list of acceptable software applications; and
    setting a longer time-to-live period for the previous version of the file.

6. The method of claim 4, wherein applying the lenient backup policy comprises at least one of:
    automatically completing the attempt to upload the file to the backup storage; and
    setting a shorter time-to-live period for the previous version of the file.

7. The method of claim 1, further comprising at least one of:
    monitoring software applications that write to the file; and
    adjusting the list of software applications that have made the changes to the file based on detecting a new software application.

8. A system for managing file backup, the system comprising:
    a detection module, stored in memory, that detects, by a computing device, an attempt to upload a file to a backup storage;
    a calculation module, stored in memory, that calculates a degree of difference indicating changes between the file and a previous version of the file on the backup storage;
    a comparison module, stored in memory, that compares, by the computing device, a list of acceptable software applications for the file with a list of software applications that have made the changes to the file, wherein the computing device tracks each software application that writes to the file by adding previously undetected software applications to the list of software applications that have made the changes to the file;
    a change module, stored in memory, that calculates a change score for the file that indicates a likelihood of corruption in the file, wherein the change score is based on:
        the degree of difference; and
        the comparison of the list of software applications that have made the changes with the list of acceptable software applications;
    a backup module, stored in memory, that applies, based on the likelihood of corruption in the file indicated by the change score, a backup policy to the attempt to upload the file, wherein the backup policy sets a time-to-live period for the previous version of the file; and at least one processor that executes the detection module, the calculation module, the comparison module, the change module, and the backup module.

9. The system of claim 8, wherein the calculation module calculates the degree of difference by:
scanning the file;
scanning the previous version of the file; and
calculating the degree of difference based on the changes detected in the file.

10. The system of claim 8, wherein the list of acceptable software applications comprises at least one of:
a software application known to write to a file type of the file;
a software application approved by a user; and
a software application approved by an administrator.

11. The system of claim 8, wherein the backup module applies the backup policy by at least one of:
applying a strict backup policy based on the change score, as determined by administrator review in comparison to other change scores; and
applying a lenient backup policy based on the change score, as determined by the administrator review in comparison to the other change scores.

12. The system of claim 11, wherein applying the strict backup policy comprises at least one of:
requesting confirmation of the attempt to upload the file from a user of the computing device;
adding a new software application from the list of software applications that have made the changes to the file to the list of acceptable software applications; and
setting a longer time-to-live period for the previous version of the file.

13. The system of claim 11, wherein applying the lenient backup policy comprises at least one of:
automatically completing the attempt to upload the file to the backup storage; and
setting a shorter time-to-live period for the previous version of the file.

14. The system of claim 8, further comprising at least one of:
monitoring software applications that write to the file; and
adjusting the list of software applications that have made the changes to the file based on detecting a new software application.

15. A non-transitory computer-readable medium comprising one or more computer-executable instructions that, when executed by at least one processor of a computing device, cause the computing device to:
detect, by the computing device, an attempt to upload a file to a backup storage;
calculate a degree of difference indicating changes between the file and a previous version of the file on the backup storage;
compare, by the computing device, a list of acceptable software applications for the file with a list of software applications that have made the changes to the file, wherein the computing device tracks each software application that writes to the file by adding previously undetected software applications to the list of software applications that have made the changes to the file;
calculate a change score for the file that indicates a likelihood of corruption in the file, wherein the change score is based on:
the degree of difference; and
the comparison of the list of software applications that have made the changes with the list of acceptable software applications; and
apply, based on the likelihood of corruption in the file indicated by the change score, a backup policy to the attempt to upload the file, wherein the backup policy sets a time-to-live period for the previous version of the file.

16. The non-transitory computer-readable medium of claim 15, wherein the computer-executable instructions cause the computing device to calculate the degree of difference by:
scanning the file;
scanning the previous version of the file; and
calculating the degree of difference based on the changes detected in the file.

17. The non-transitory computer-readable medium of claim 15, wherein the list of acceptable software applications comprises at least one of:
a software application known to write to a file type of the file;
a software application approved by a user; and
a software application approved by an administrator.

18. The non-transitory computer-readable medium of claim 15, wherein the computer-executable instructions cause the computing device to apply the backup policy by at least one of:
applying a strict backup policy based on the change score, as determined by administrator review in comparison to other change scores; and
applying a lenient backup policy based on the change score, as determined by the administrator review in comparison to the other change scores.

19. The non-transitory computer-readable medium of claim 18, wherein applying the strict backup policy comprises at least one of:
requesting confirmation of the attempt to upload the file from a user of the computing device;
adding a new software application from the list of software applications that have made the changes to the file to the list of acceptable software applications; and
setting a longer time-to-live period for the previous version of the file.

20. The non-transitory computer-readable medium of claim 18, wherein applying the lenient backup policy comprises at least one of:
automatically completing the attempt to upload the file to the backup storage; and
setting a shorter time-to-live period for the previous version of the file.

* * * * *